(No Model.)

C. H. & G. GREAVES.
TIRE FOR CYCLES.

No. 601,055. Patented Mar. 22, 1898.

Witnesses
John Walsh
Abu Reed

Inventors
Chas. H. Greaves
George Greaves

UNITED STATES PATENT OFFICE.

CHARLES H. GREAVES AND GEORGE GREAVES, OF GOMERSAL, ENGLAND.

TIRE FOR CYCLES.

SPECIFICATION forming part of Letters Patent No. 601,055, dated March 22, 1898.

Application filed October 18, 1897. Serial No. 655,572. (No model.) Patented in England September 23, 1897, No. 21,803.

*To all whom it may concern:*

Be it known that we, CHARLES HENRY GREAVES and GEORGE GREAVES, subjects of the Queen of Great Britain, residing at Gomersal, near Leeds, in the county of York, England, have invented new and useful Improvements in the Construction of Tires for Cycles and other Vehicles, (patented in England September 23, 1897, No. 21,803,) of which the following is a specification.

The object of our invention is to dispense with the use of air-tubes in cycle and other tires and yet produce a perfectly elastic tire upon which puncture has no effect.

Figure 1:
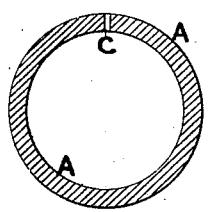
Figure 2:
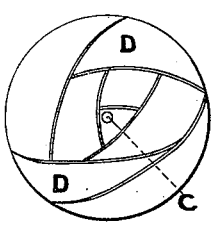
Figure 3:
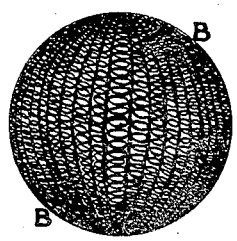
Figure 4:
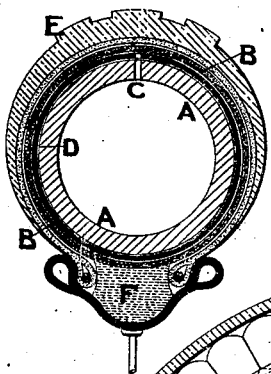
Figure 5:
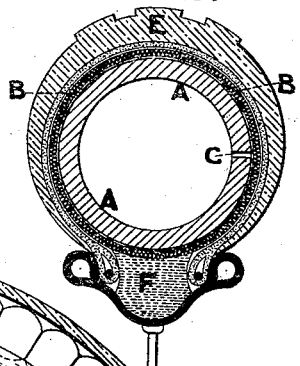
Figure 6:
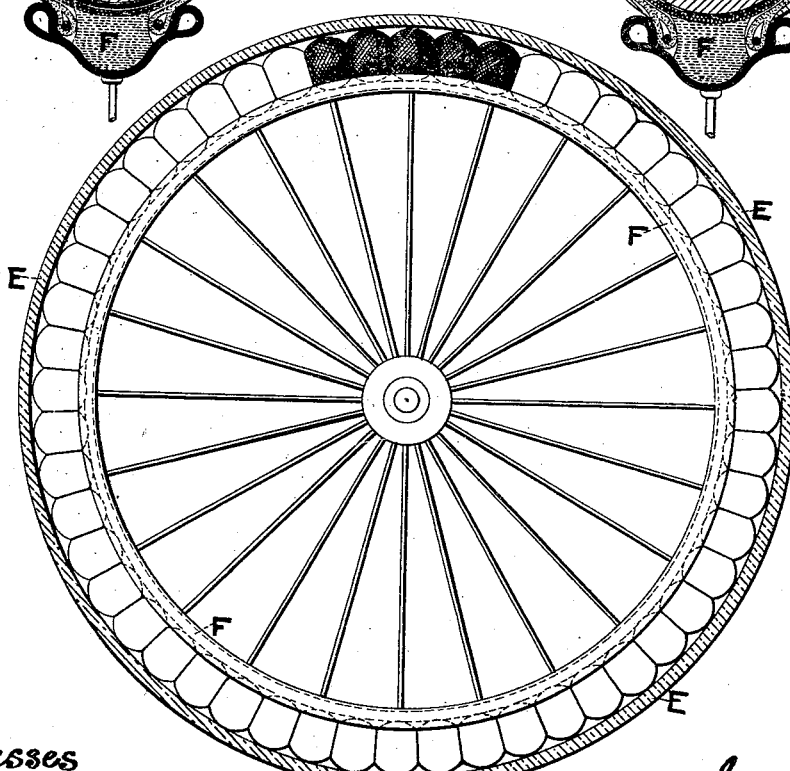

In the drawings, Figure 1 is an elevation showing cross-section of india-rubber ball in its first stage. Fig. 2 is an elevation of ball with india-rubber wrapping cemented on in a stretched state. Fig. 3 is an elevation of ball in its finished state with creweled, woven, or porous cover. Fig. 4 is an elevation in cross-section of tire constructed of hollow balls or sections with packing. Fig. 5 is a cross-sectional elevation of tire without rubber wrapping around the balls. Fig. 6 shows a wheel in elevation with tire consisting of balls or sections and cover shown partly in section.

We employ a number of preferably hollow balls or separate hollow sectional pieces A of india-rubber with creweled, knitted, or woven coverings B and with one or more small breathing or air holes C in each ball. The balls or hollow segments for the back wheel are strengthened and their resiliency increased by being preferably wrapped with strips of elastic rubber D, cemented on under tension.

Balls for the front wheel do not require the elastic-rubber wrapping, but are creweled or covered, as hereinafter mentioned.

It having been found that rubber in contact with rubber wears quickly, we cover the balls or sections with a creweled, knitted, or woven fibrous covering B.

The balls or sections are inclosed in the ordinary outer cover E, of rubber or other suitable substance, which is secured to the wheel-rim by lacing or other suitable means.

The balls or sections are preferably packed close together in the groove of the rim and preferably bedded upon a seating F, made of wool or worsted yarns, asbestos, cork, or other suitable material, and the cover is drawn over them and laced or fastened in any suitable manner so as to hold them in position. As each ball is compressed and a little air displaced under the tread of the wheel it quickly returns to its normal shape and automatically replaces the air displaced from it. Balls so constructed have great resiliency and cannot burst. They also retain their hardness. Puncture does not affect any of the balls; but when required the cover can be easily unlaced and the balls renewed should any wear out.

What we claim as the invention, and desire to secure by Letters Patent, is—

1. The combination, with a wheel-rim; of hollow elastic sections or balls, individual covers of tough material inclosing the said sections and extending between them, said covered sections being packed in a series around the rim so that each section is compressed; and an outer cover common to all the said sections, substantially as set forth.

2. The combination, with a wheel-rim; of a series of elastic balls encircling the rim, each ball being provided with an inner jacket formed of a strip of elastic material wound upon it under tension, and an outer individual cover of tough fibrous material; and an outer cover common to all the said balls, substantially as set forth.

In testimony whereof we affix our signatures in presence of two witnesses.

CHAS. H. GREAVES.
GEORGE GREAVES.

Witnesses:
NORMAN DEWHURST,
ELI MITCHELL.